United States Patent [19]

Coscia et al.

[11] 3,956,122

[45] May 11, 1976

[54] CATIONIC ARYLAMIDE-STYRENE COPOLYMERS AND FLOCCULATION OF SEWAGE THEREWITH

[75] Inventors: Anthony Thomas Coscia, South Norwalk; Hans Peter Panzer; John Andrew Sedlak, both of Stamford, all of Conn.

[73] Assignee: American Cyanamid Company, Stamford, Conn.

[22] Filed: Dec. 12, 1974

[21] Appl. No.: 531,948

Related U.S. Application Data

[63] Continuation-in-part of Ser. No. 316,630, Dec. 18, 1972, abandoned.

[52] U.S. Cl. ................................................. 210/54
[51] Int. Cl.² ......................................... B01D 21/01
[58] Field of Search ............................. 210/10, 54; 260/29.4 UA

[56] References Cited

UNITED STATES PATENTS

| | | | |
|---|---|---|---|
| 3,472,767 | 10/1969 | Lees | 210/54 |
| 3,492,226 | 1/1970 | Ryznar | 210/54 |
| 3,658,772 | 4/1972 | Volk et al. | 210/54 |
| 3,761,407 | 9/1973 | Hoke | 210/54 |

*Primary Examiner*—Thomas G. Wyse
*Attorney, Agent, or Firm*—Charles F. Costello, Jr.; James T. Dunn; Evans Kahn

[57] ABSTRACT

Water-dispersible but water-insoluble vinyl polymers composed of at least 40 mol percent of hydrophilic cationic linkages, at least 5 mol percent of hydrophobic linkages and up to 10 mol percent of hydrophilic anionic linkages are flocculating agents for the solids in industrial effluents (including raw and digested sewage). The polymers form stable dispersions in water, and are employed in that state.

11 Claims, No Drawings

CATIONIC ARYLAMIDE-STYRENE COPOLYMERS AND FLOCCULATION OF SEWAGE THEREWITH

This is a continuation-in-part of our copending application Ser. No. 316,630 filed on Dec. 18, 1972, now abandoned.

The present invention relates to novel water-insoluble but water-dispersible cationic polymers, to aqueous dispersions of the polymers, and to the flocculation of suspended solids in aqueous medium by the action of these polymers.

The clarification of suspended solids in aqueous medium has become important because it is national policy to end pollution of our lakes and rivers and the ocean. Implementation of this policy requires that the suspended solids in industrial effluents be flocculated efficiently.

In the case of sewage the solids are generally first modified by subjecting the sewage to bacterial digestion in tanks, decanting the comparatively clean upper layer from the solids which settle as "sludge" or lower layer, flocculating the solids in the sludge, and separating the solids from the aqueous phase by filtration, centrifugation, flotation, or other convenient method. Flocculation of the solids in the sludge is a pivotal step in the process.

The discovery has now been made that the cationic water-insoluble but water-dispersible polymer containing hydrophilic cationic linkages, for example N-[di-$C_{1-3}$ alkyl)-aminomethyl]acrylamide linkages, hydrophobic vinyl linkages (for example styrene linkages) in respective molar proportions in excess of 40 mol percent and 5 mol percent, and up to 10 mol percent of hydrophilic anionic linkages is specially useful as flocculant for the solids in industrial effluents, provided that the ratio of hydrophilic linkages to hydrophobic linkages in the polymer is such that the polymer is insoluble in water but is dispersible therein by gentle stirring. As a result the polymer disperses to colloidal or near-colloidal dimensions in water and forms a substantially self-sustaining suspension or latex therein. The water used for this test is substantially pure water, e.g., laboratory distilled water.

Polymers containing certain of these linkages and methods for the preparation thereof are disclosed in copending application Ser. No. 211,624, filed on Dec. 23, 1971 by J. A. Sedlak, now U.S. Pat. No. 3,875,097.

In preferred instances the polymes and process of the present invention possess special advantages as follows:

1. The polymer has a lower molecular weight than those heretofore generally used for the purpose. The polymer is therefore more economical to make and to pump.

2. The process is efficient. Extensive flocculation is effected by use of only a small amount of the polymer.

3. The flocs produced by the process are unusually compact and accordingly settle rapidly with consequent more rapid clarification and are more easily filtered.

4. The flocs are crumb-like and possess little adhesiveness and so can be removed from filter cloth more easily.

The reason why the hydrophobic linkages in the polymer produce these advantages in the flocculation of suspended solids is not known, and we do not wish to be restricted by any theory. However, for whatever help it may provide in understanding the invention, we suggest that the effect of the hydrophobic linkages is to enhance the affinity of the polymer for particulate matter and so cause more extensive or firmer particle-polymer-particle bonds, resulting in stronger or more extensive agglomeration of the suspensoids.

The invention is usefully applied to the clarification of raw sewage (i.e., dilute sewage such as is delivered to sewage disposal plants), raw primary sludge (obtained by settling raw sewage), and sewage sludge (raw sewage which has been decomposed or "digested" by microorganisms and allowed to settle with formation of a sludge). In the latter and most common instance the supernatant substantially clear layer is drawn off and to the residual sludge having a solids content of about 1 percent to 10 percent solids by weight is uniformly added a small but effective amount as flocculant for the solids in said sludge of an aqueous dispersion of a cationic vinyl polymer as described above.

The polymer is uniformly distributed through the sewage, thereby flocculating a substantial proportion of the solids. The action of the polymer is rapid. Its flocculating action is substantially complete within a few minutes.

The amount of polymer to be employed in any instance depends on such variables as the character (i.e., composition) of the suspended solids, the concentration at which the solids are present therein, the pH of the medium, and the cationic density and hydrophobic-hydrophilic balance of the linkages in the polymer. A suitable amount, however, can be determined in any instance by laboratory trial.

The polymers referred to above can be conveniently prepared by subjecting a water-insoluble vinyl polymer containing at least 40 mol percent of acrylamide linkages and 5 mol percent of hydrophobic vinyl linkages to the Mannich reaction. A wide variety of polymers suitable for this purpose are known. Styrene is the hydrophobic linkage usually present, but other hydrophobic linkages may be present along with or in place of the styrene linkages, for example methyl methacrylate, acrylonitrile, octadecyl acrylate, and lauryl acrylate. A small proportion of anionic linkages may be present (acrylic acid, maleic acid and styrene sulfonic acid). Linkages which are neither amides nor hydrophobic may also be present as spacing or diluent linkages.

The Mannich reaction is effected by subjecting the polymer to the action of formaldehyde and a water-soluble secondary amine, typically dimethylamine. The two reagents are provided in about equimolar amounts but the amine can be provided in excess. The Mannich reaction hydrolyzes a small proportion (typically 1 to 5 mol percent) of the acrylamide linkages to acrylic acid linkages and, if desired, an additional proportion of the acrylamide linkages can be hydrolyzed; hence the resulting polymer is more or less amphoteric. The reaction as applied to water-soluble acrylamide polymers is illustrated in Foster U.S. Pat. No. 3,323,979.

The proportion of hydrophobic substituents present in the final polymer (i.e., after the Mannich reaction) is such that the polymer is insoluble in water but forms a dispersion when gently agitated therewith. The polymer may and usually does contain unsubstituted acrylamide linkages. The suspension is substantially self-sustaining (i.e., it does not noticeably settle on standing for a few days). The proportion of hydrophobic linkages needed to achieve water-insolubility but water-dispersibility has not been ascertained for all instances because this property depends in part upon the hydrophilic properties of the hydrophilic linkages present in the polymer macromolecule and on the molar proportion of these linkages in the polymer and in part on the hydrophobic properties of the hydrophobic linkages present and the molar proportion of these linkages in the polymer. However, a variety of suitable polymers are shown in the copending application and in the examples herein. Further suitable polymers can be determined by laboratory trial.

As a guide, best flocculation is generally caused by polymers of maximum cationic density, i.e., by polymers wherein the ratio of cationic linkages to the other linkages in the polymer is as high as possible, consonant with the requirement that the polymer be water-insoluble but water-dispersible.

The proportion of anionic linkages is small (e.g., about 1 – 5 mol percent), and these linkages are often advantageous as for example when alum or $FeCl_3$ or other water-soluble iron salt is added to assist flocculation and the flocculated solids are recovered by filtration.

The flocculation proceeds well when the polymer is composed of N-(dimethylaminomethyl)acrylamide, acrylamide, styrene and acrylic acid linkages in about 70 : 15 : 10 : 5 molar ratio. Such polymer is water-insoluble yet water-dispersible, has a high cationic density, yet contains a sufficient proportion of anionic linkages to permit its use with alum. Since the styrene linkages are strongly hydrophobic, only a small percentage of these ionically inert linkages are present and this in turn permits the number of hydrophilic cationic linkages to be large.

The herein-described polymers can be applied in similar manner for flocculating (a) colloidal bituminous coal particles in the effluent from the transport of coal in slurry form, (b) the colloidal mineral particles in mine water effluent, and (c) the fiber fines and particles of mineral filler in the effluent from paper mills. Evidently the polymers are broadly effective.

The invention is further illustrated by the examples which follow. These examples are best embodiments of the invention and are not to be construed in limitation thereof.

EXAMPLE 1

The following illustrates the preparation of a cationic, water-dispersible but water-insoluble vinylamide polymer containing hydrophobic aryl substituents, which is suitable for use in the process of the present invention.

To a rapidly stirred mixture of 50.4 g. (0.708 mol) of acrylamide, 9.15 g. (0.088 mol) of styrene, and 0.6 g. of sodium dicyclohexylsulfosuccinate as emulsifier in 327 g. of deoxygenated water at 50°C. under a blanket of nitrogen is added 0.149 g. of ammonium persulfate dissolved in 10 g. of water. The mixture is rapidly heated to 63°C. and agitation is continued for 16 hours. The product is a white opaque latex which does not cream or separate on standing for one month at 25°C.

The latex is diluted to a polymer content of 5 percent by weight. To 100 g. of this latex at 25°C. are added with stirring 4.84 g. of 37 percent aqueous formaldehyde and 6.70 g. of 40 percent aqueous dimethylamine; these quantities correspond to 100 mol percent of formaldehyde and 100 mol percent of dimethylamine per mol of acrylamide linkages in the polymer. The polymer is storage-stable. After storage for two weeks at room temperature, it is unchanged in appearance, and analysis (by potassium polyvinylsulfate titration with spectrophotometric endpoint) shows that 79 mol percent of the acrylamide linkages carry N-(dimethylaminomethyl) substituents. It is thus composed of N-(dimethylaminomethyl)acrylamide, acrylamide, styrene and acrylic acid linkages in approximately 70 : 15 : 10 : 5 molar ratio.

EXAMPLE 2

The following illustrates the preparation of a polymer similar to the above in solubility characteristics but containing only about half the number of cationic substituents.

The procedure of Example 1 is repeated to the point when the latex has been diluted to 5 percent polymer solids. There are then added with stirring 2.42 g. of 37 percent aqueous formaldehyde and 3.35 g. of 40 percent dimethylamine, each of which quantities correspond to 50 mol percent of the acrylamide linkages present in the polymer. Analysis shows that 46 mol percent of the acrylamide linkages carry N-(dimethylaminomethyl) substituents. The product is an opaque latex having substantially the same water-dispersibility and stability properties as the product of Example 1.

EXAMPLE 3

The following illustrates the preparation of a polymer suitable for use in the process of the present invention without use of an emulsifier.

The procedure of Example 1 is repeated except that the emulsifier is omitted and the polymerization is performed at 56°C. for 24 hours. On completion of the polymerization reaction the latex at 5 percent polymer solids has a Brookfield viscosity at 25°C. of 1100 centipoises.

The latex resembles that of Example 1 but is less viscous.

EXAMPLE 4

The following illustrates the preparation of a water-dispersible but water-insoluble cationic vinylamide polymer containing ester linkages of less hydrophobic nature than styrene linkages.

A solution of 30.0 g. (0.421 mol) of acrylamide in 435 g. of deoxygenated water is heated to 70°C. Then 0.04 g. of ammonium persulfate in 25 g. of water is added. The mixture is agitated under a $N_2$ blanket at 70°C. for 40 minutes while 8.0g. (0.08 mol) of methyl methacrylate is added dropwise, and then for 8 hours more while the temperature is gradually raised to 80°C.

To the product at 25°C. are added with stirring 37 percent aqueous formaldehyde and 40 percent aqueous dimethylamine in amount sufficient to provide 100 mol percent each of formaldehyde and dimethylamine per mol of acrylamide linkages in the polymer. After 2 ¾ hours, the product is diluted to 7.5 percent solids; it is a viscous, white opaque dispersion. The polymer has a molecular weight in excess of 750,000.

EXAMPLE 5

The following illustrates the comparative effectiveness of the foregoing polymers as flocculants for the solids in sewage sludge.

Before use, the polymer dispersions are diluted to a convenient concentration by addition of water. The effectiveness of each dispersion as flocculant is determined by adding the dispersion to 150 ml. of a municipal activated sewage sludge, gently stirring the sludge for a few moments to distribute the flocculant therethrough and to allow flocculation to come to an endpoint, filtering the sludge under vacuum of 28 in. Hg, and noting the volume of clear liquid collected. The more liquid collected per unit time, the better is the flocculant. Results are as follows.

| Run No. | Polymer Ex. No. | Ml. Added[1] | Sludge[3] pH[2] | % Solids | Ml. Filtrate After: 0.5 Min. | 1 Min. | 2 Min. | 3 Min. |
|---|---|---|---|---|---|---|---|---|
| — | — | Control | 7 | 3.65 | | 20 | | |
| 1 | 1 | 1 | 7 | 3.65 | 28 | 36 | 45 | 51 |
| 2 | | 2 | | | 31 | 49 | 64 | 74 |
| 3 | | 4 | | | 77 | 95 | 113 | 122 |
| 4 | | 6 | | | 101 | 118 | 128 | 133 |
| 5 | | 8 | | | 98 | 119 | 130 | 135 |
| 6 | | 10 | | | 88 | 104 | 124 | 131 |
| 7 | 1 | 2 | 3.7 | 3.65 | 40 | 50 | 64 | 76 |
| 8 | | 4 | | | 99 | 116 | 133 | 140 |
| 9 | | 6 | | | 113 | 130 | 140 | 144 |
| 10 | | 8 | | | 107 | 130 | 140 | 146 |
| — | — | Control | 7 | 3.65 | | 20 | | |
| 11 | 2 | 1 | 7 | 3.65 | 23 | 30 | 39 | 45 |
| 12 | | 2 | | | 34 | 44 | 56 | 65 |
| 13 | | 4 | | | 62 | 81 | 100 | 111 |
| 14 | | 6 | | | 74 | 94 | 113 | 123 |
| 15 | | 8 | | | 82 | 107 | 122 | 130 |
| 16 | | 10 | | | 82 | 106 | 120 | 127 |
| 17 | | 12 | | | 66 | 90 | 115 | 126 |

[1] Ml. of 1% resin latex per 150 ml. of sludge.
[2] After addition of latex.
[3] Greenwich, Conn. activated sludge.

It will be seen that at pH 7 best results after one minute are obtained by the method of run 5, whereas at pH 3.7 best results are obtained by the method of run 9.

EXAMPLE 6

The following illustrates the effectiveness of the flocculating process of the present invention performed on a more dilute sludge with a polymer prepared in the absence of an emulsifying agent.

| Run No. | Polymer Ex. No. | Ml. Added[1] | Sludge[3] pH[2] | % Solids | Ml. Filtrate After: 0.5 Min. | 1 Min. | 2 Min. | 3 Min. |
|---|---|---|---|---|---|---|---|---|
| — | — | Control | 7 | 2.95 | | 25 | | |
| 1 | 3 | 2 | 7 | 2.95 | 84 | 105 | 124 | 133 |
| 2 | | 4 | | | 116 | 133 | 141 | 146 |
| 3 | | 6 | | | 116 | 135 | 142 | 146 |
| 4 | | 8 | | | 100 | 128 | 140 | 144 |

[1] Ml. of 1% resin latex per 150 ml. of sludge.
[2] After addition of latex.
[3] Greenwich, Conn. activated sludge.

EXAMPLE 7

The following illustrates the process of the present invention performed with the aid of a flocculant wherein the hydrophobic component is an ester-containing linkage (methyl methacrylate).

The procedure of Example 5 is repeated, except as noted in the table below, with results as follows.

| Run No. | Polymer Ex. No. | Ml. Added[1] | Sludge[3] pH[2] | % Solids | Ml. Filtrate After: 0.5 Min. | 1 Min. | 2 Min. |
|---|---|---|---|---|---|---|---|
| — | — | Control | 7 | 3.86 | | 20 | |
| 1 | 4 | 4 | 4 | 3.86 | 78 | 97 | 112 |
| 2 | | 6 | | | 94 | 114 | 126 |
| 3 | | 8 | | | 116 | 130 | 136 |
| 4 | | 10 | | | 82 | 102 | 119 |

[1] Ml. of 0.5% resin latex per 150 ml. of sludge.
[2] Before addition of latex.
[3] Greenwich, Conn. activated sludge.

EXAMPLE 8

The following illustrates the preparation of a water-insoluble but water-dispersible polymer suitable for the practice of the present invention wherein the hydrophobic component is a nitrile substituent.

To an aqueous dispersion of a 53 : 47 molar ratio acrylamide : acrylonitrile copolymer (prepared by the method of Example 1) at 25°C. are added formalin and dimethylamine to provide one mol of each reagent per acrylamide linkage in the polymer and the mixture is reacted according to Example 1.

The product is an effective flocculant for the solids in sewage.

The aforementioned application Serial No. 211,624 forms part of the parent application as Exhibit A thereof and Exhibit A is now incorporated by reference into the present application.

EXAMPLE 9

The following illustrates the preparation of a flocculant according to the present invention which includes 2-methyl-5-vinylpyridine linkages.

The procedure of Example 1 is repeated, up to the point of the Mannich reaction, except that 40.0 g. of the acrylamide is replaced by 56.9 g. of 2-mthyl-5-vinyl pyridine and the solution is adjusted to pH 3.5 before polymerization.

EXAMPLE 10

The following illustrates the preparation of a flocculant according to the present invention which includes a dimethyl sulfate quaternary of N,N-dimethylaminoethyl methacrylate linkage.

The procedure of Example 1 is repeated up to the point of the Mannich reaction, except that 40.0 g. of the acrylamide is replaced by 135.5 g. of the dimethyl sulfate quaternary of N,N-dimethylaminoethyl methacrylate and the solution is adjusted to pH 3.5 before polymerization.

EXAMPLE 11

The following illustrates the process of the present invention applied to the clarification of a suspension containing iron ore tailings. The discharge from the froth flotation of iron ore is an aqueous slurry of 1 – 2 percent solids content comprising colloidal silica, clay, and small amounts of iron oxide.

The efficiency of the process of the present invention is determined by use of a Phipps & Bird multi-place stirrer by the following procedure.

A 1-liter sample of the tailings slurry at its natural pH (6–7) is placed in a beaker. A 20-cc portion of the polymer dispersion to be evaluated is added and the mixture is stirred at 100 r.p.m. for one minute. The stirring is stopped and the free-settling rate is measured by determining the time required for the interface between supernatant and flocculated solids to descent about 2 inches. After 15 minutes of standing, the turbidity of a supernatant sample is measured with a Hach turbidimeter.

A standard flocculant used for comparison is the condensation product of methylamine and epichlorohydrin with molecular weight 10,000–200,000 prepared according to U.S. Pat. No. 3,567,659. The addition of 2 p.p.m. (solids weight basis) of the condensation product produces a free-settling rate of 6.8 ft./hr. and a supernatant turbidity of 46 Jackson turbidity units, while 1.2 p.p.m. of the polymer of Example 1 produces equivalent results.

EXAMPLE 12

The following illustrates the process of the present invention applied to the flocculation of suspended solids in the discharge from a coal processing plant.

The effluent from a coal processing plant is an aqueous suspension of 2 – 4 percent solids content comprising colloidal clay, silica, and other waste non-carbon minerals, and containing small amounts of very fine bituminous coal.

The test procedure for determining the efficiency of a flocculant for these solids is as follows:

A 1-liter sample of the suspension at its natural pH (6–7) is placed in a 1,000-cc. graduated cylinder. A 20-cc. portion of the polymer dispersion to be evaluated is added and the mixture is manually stirred with a metal plunger. The free-settling rate is then measured by determining the time required for the interface between supernatant and flocculated solids to descend six inches. After 15 minutes of standing, the turbidity of a supernatant layer is measured with a Hach turbidimeter.

The standard flocculant used for comparison is a 75 : 25 molar ratio dimethylaminomethylacrylamide : acrylamide copolymer (molecular weight 3 to 5 million). The addition of 15 p.p.m. (solids weight basis) of this polymer produces a free-settling rate of 17.2 ft./hr. and a supernatant turbidity of 143 Jackson turbidity units, while the same quantity of the polymer of Example 1 produces a free-settling rate of 21.4 ft./hr. and a supernatant turbidity of 94 Jackson turbidity units.

We claim:

1. A process for flocculating solids suspended in aqueous medium, which comprises uniformly adding to said medium a small but effective amount as flocculant for said solids of an aqueous dispersion of a cationic vinyl polymer comprising at least 40 mol percent of N-[di($C_{1-3}$alkyl)aminomethyl]acrylamide hydrophilic cationic linkages, at least 5 mol percent of vinyl hydrophobic linkages and up to 10 mol percent of acrylic acid hydrophilic anionic linkages, the number of said hydrophobic linkages being sufficiently large that the polymer is insoluble in substantially pure water and being sufficiently small that the polymer is auto-dispersible in substantially pure water, distributing said polymer through said medium thereby flocculating a substantial proportion of said solids, and separating said flocculated solids and said medium.

2. A process according to claim 1 wherein the suspended solids are bituminous coal particles.

3. A process according to claim 1 wherein the suspended solids are the mineral particles in the effluent from the froth flotation of iron ore.

4. A process according to claim 1 wherein the sewage solids are the solids of raw sewage.

5. A process according to claim 1 wherein the sewage solids are the solids of digested raw sewage.

6. A process according to claim 1 wherein the N-[di($C_{1-3}$alkyl)aminomethyl]acrylamide hydrophilic cationic linkages are N-(dimethylaminomethyl)acrylamide linkages.

7. A process according to claim 1 wherein the vinyl hydrophobic linkages are styrene linkages.

8. A process according to claim 1 wherein the vinyl hydrophobic linkages are acrylonitrile linkages.

9. A process according to claim 1 wherein the vinyl hydrophobic linkages are methyl methacrylate linkages.

10. A process according to claim 1 wherein the polymer contains 1 to 5 mol percent of acrylic acid hydrophilic anionic linkages.

11. A process according to claim 1 wherein the polymer is composed of N-(dimethylaminomethyl)acrylamide hydrophilic cationic linkages, acrylamide, styrene hydrophobic linkages, and acrylic acid hydrophilic anionic linkages in about 70 : 15 : 10 : 5 molar ratio.

* * * * *